United States Patent
Heusermann et al.

(10) Patent No.: US 9,852,385 B2
(45) Date of Patent: Dec. 26, 2017

(54) PROCESSING OF BUSINESS OBJECT IDENTIFIERS IN MASTER DATA INTEGRATION SCENARIOS INVOLVING NON-LOCAL IDENTIFIERS

(75) Inventors: Knut Heusermann, Bad Schoenborn (DE); Matthias Becker, Bruchsal (DE); Christian Hohmann, Walldorf (DE); Sophie Kraut, Walldorf (DE); Torsten Buecheler, Speyer (DE); Xenia Rieger, Walldorf (DE); Dietmar Henkes, Schwetzingen (DE); Guang Yang, Bad Schoenborn (DE); Olga Kreindlina, Heidelberg (DE); Thomas Vogt, Neustadt (DE); Walter Zimmermann, Walldorf (DE); Oliver Berger, Walldorf (DE); Martin Haerterich, Wiesloch (DE); Marcus Echter, Walldorf (DE); Albert Neumueller, Walldorf (DE); Stefan Moeller, Dielheim (DE)

(73) Assignee: SAP SE, Walldorf (DE)

( * ) Notice: Subject to any disclaimer, the term of this patent is extended or adjusted under 35 U.S.C. 154(b) by 1610 days.

(21) Appl. No.: 13/314,632

(22) Filed: Dec. 8, 2011

(65) Prior Publication Data
US 2013/0151264 A1   Jun. 13, 2013

(51) Int. Cl.
G06F 15/00 (2006.01)
G06Q 10/06 (2012.01)
G06F 17/30 (2006.01)

(52) U.S. Cl.
CPC .......... *G06Q 10/06* (2013.01); *G06F 17/303* (2013.01); *G06F 17/30914* (2013.01); *G06F 17/30563* (2013.01)

(58) Field of Classification Search
CPC .. G06Q 10/10; G06Q 10/06; G06F 17/30595; G06F 17/30241; G06F 17/30873; G06F 17/30563; G06F 17/303; G06F 17/30914; G01C 21/26; G01C 21/20
See application file for complete search history.

(56) References Cited

U.S. PATENT DOCUMENTS

| | | | | |
|---|---|---|---|---|
| 8,087,086 B1 * | 12/2011 | Lai | .......................... | G06F 21/56 726/24 |
| 8,185,472 B1 * | 5/2012 | Boyd | ................. | G06Q 20/1085 705/43 |
| 8,226,676 B2 * | 7/2012 | Yamada | ........... | A61B 17/32006 310/328 |
| 8,266,676 B2 * | 9/2012 | Hardjono | ............ | H04L 63/0823 709/229 |
| 2004/0056889 A1 * | 3/2004 | Katano | ................... | G06F 21/31 715/741 |
| 2005/0289350 A1 * | 12/2005 | Schmidt-Karaca | ..... | G06F 21/31 713/176 |

(Continued)

*Primary Examiner* — Patrice Winder
*Assistant Examiner* — Aye M Aung
(74) *Attorney, Agent, or Firm* — Fountainhead Law Group P.C.

(57) ABSTRACT

Disclosed is a mechanism to process business object IDs in inbound and outbound processing. The mechanism takes into account a mapping table, matching capabilities, number ranges, inbound error and conflict handling, inbound processing, outbound processing, initial load, and data migration.

20 Claims, 8 Drawing Sheets

(56) References Cited

U.S. PATENT DOCUMENTS

| | | | | |
|---|---|---|---|---|
| 2008/0319887 A1* | 12/2008 | Pizzi | ............ | G06Q 40/00 705/35 |
| 2009/0037995 A1* | 2/2009 | Zapata | ............ | G06F 21/43 726/9 |
| 2009/0312090 A1* | 12/2009 | Shnowske | ............ | G06Q 40/02 463/25 |

* cited by examiner

PROCESSING OF BUSINESS OBJECT IDENTIFIERS IN MASTER DATA INTEGRATION SCENARIOS INVOLVING NON-LOCAL IDENTIFIERS

BACKGROUND

The present invention relates to business applications and in particular to processing business objects between different business applications.

Unless otherwise indicated herein, the approaches described in this section are not prior art to the claims in this application and are not admitted to be prior art by inclusion in this section.

An enterprise typically operates several business applications in order to manage its business. Typical business applications include processes such as Enterprise Resource Planning (ERP), Customer Relations Management (CRM), and so on. Each business application typically maintains its own business objects and master data. Integration of these business applications typically require synchronization of master data that is common between systems. A specific example, a business integration scenario between SAP® ERP and SAP® Business ByDesign or SAP® networked applications (e.g., SAP® Sales on Demand) may require synchronization of master data between the participating systems (typically referred to as communication partners).

Very often, a clear data ownership of business objects cannot be defined and changes to master data may be initiated by any of the communication partners. Furthermore, business applications typically are aware of only their own business objects. Therefore, identifying business objects across business applications presents a challenge when attempting to synchronize data (e.g., master data) among several business applications.

To illustrate, consider the usage scenario shown in FIGS. 1A and 1B. An enterprise 100 may have multiple business systems deployed to run its business. Suppose a legacy system 102 has a previously installed business application (e.g., SAP® ERP) and that a new system 104 has been installed (e.g., SAP® ByDesign or SAP® sales on Demand). Referring to FIG. 1A, changes made to business objects in the legacy system 102 may need to be synchronized with corresponding business objects in the new system 104 in order to maintain data consistency and data integrity within the enterprise. However, while the legacy system 102 will know about its locally created and managed business objects, the legacy system is not likely to know about the business objects in the new system 104. Vice versa, referring to FIG. 1B, changes made to business objects in the new system 104 may need to be synchronized with corresponding business objects in the legacy system 102. However, the new system 104 is not likely to know which business objects in the legacy system 102 correspond to its local business objects.

These and other issues are addressed by embodiments of the present invention, individually and collectively.

SUMMARY

In embodiments, a method for processing a business object includes receiving incoming business object information from a sending business application, pertaining to an inbound business object. If the inbound business object does not have a corresponding local business object, then a local business object is created (e.g., instantiated) along with an associated business object identifier. The local business object may be obtained by finding a matching business object. The local business object may be created by instantiating a business object. A correspondence between the inbound business object and the obtained business object is created. The obtained business object is then updated with the received incoming information.

If the inbound business object does have a corresponding local business object, then a determination is made whether that correspondence is deemed verified or not. If verified, then the corresponding local business object is updated with the received incoming information.

If the correspondence between the local business object and the inbound business object is not verified, then a verification process is conducted. In an embodiment, the verification process may include comparing data comprising the received incoming information with data comprising the corresponding non-verified local business object. If the verification is positive, then the local business object is updated with the received incoming information, and the correspondence designated as being verified.

If the verification is negative, then a new mapping with the inbound business object is created. In an embodiment, the inbound business object matched with another local business object, or a new local business object may be instantiated. The obtained business object is then updated with the received incoming information.

In an embodiment, if the verification is negative, a user interaction may be invoked to allow a user to confirm or deny the verification.

In embodiments, the method further includes sending an outbound business object to a receiving business application. A remote identifier is created using a naming rule of the receiving business application, to identify a business object that is local to the receiving business application. The remote identifier is associated with the identifier of the outbound business object, thereby establishing a correspondence between the outbound business object and the business object that is local to the receiving business application. The correspondence is designated as not verified.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
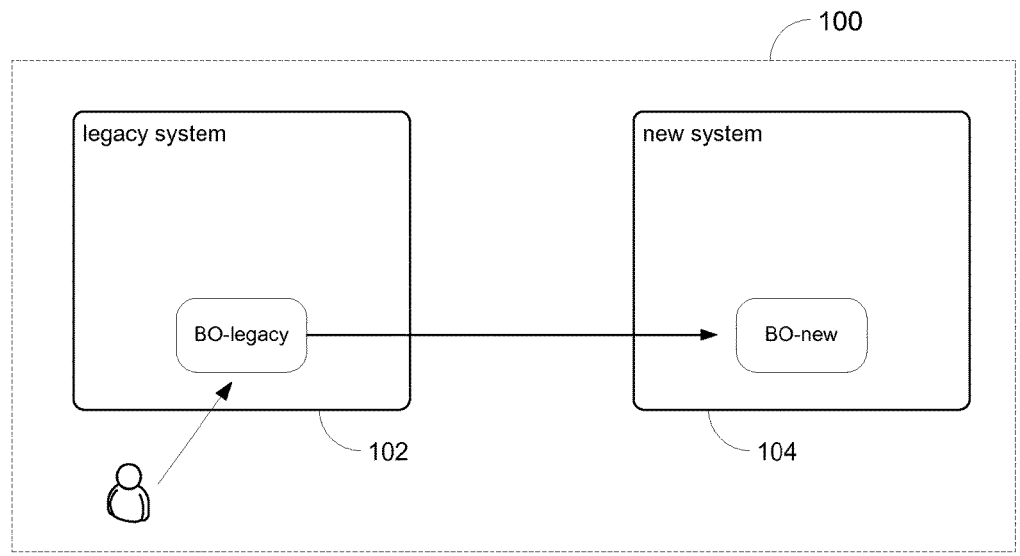
FIGS. 1A and 1B represent typical synchronization sequences between business applications that have common business objects.
Figure 1B:
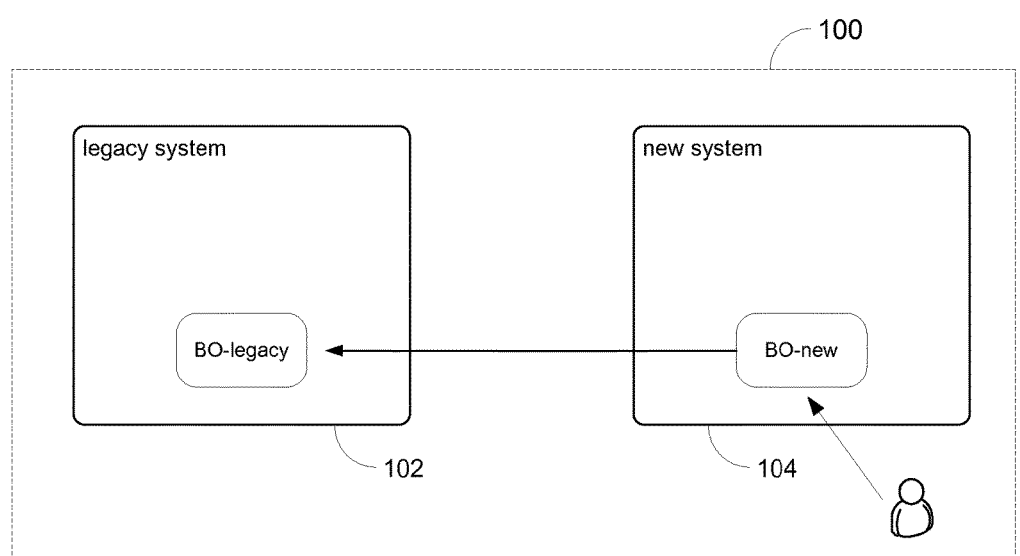
Figure 2:
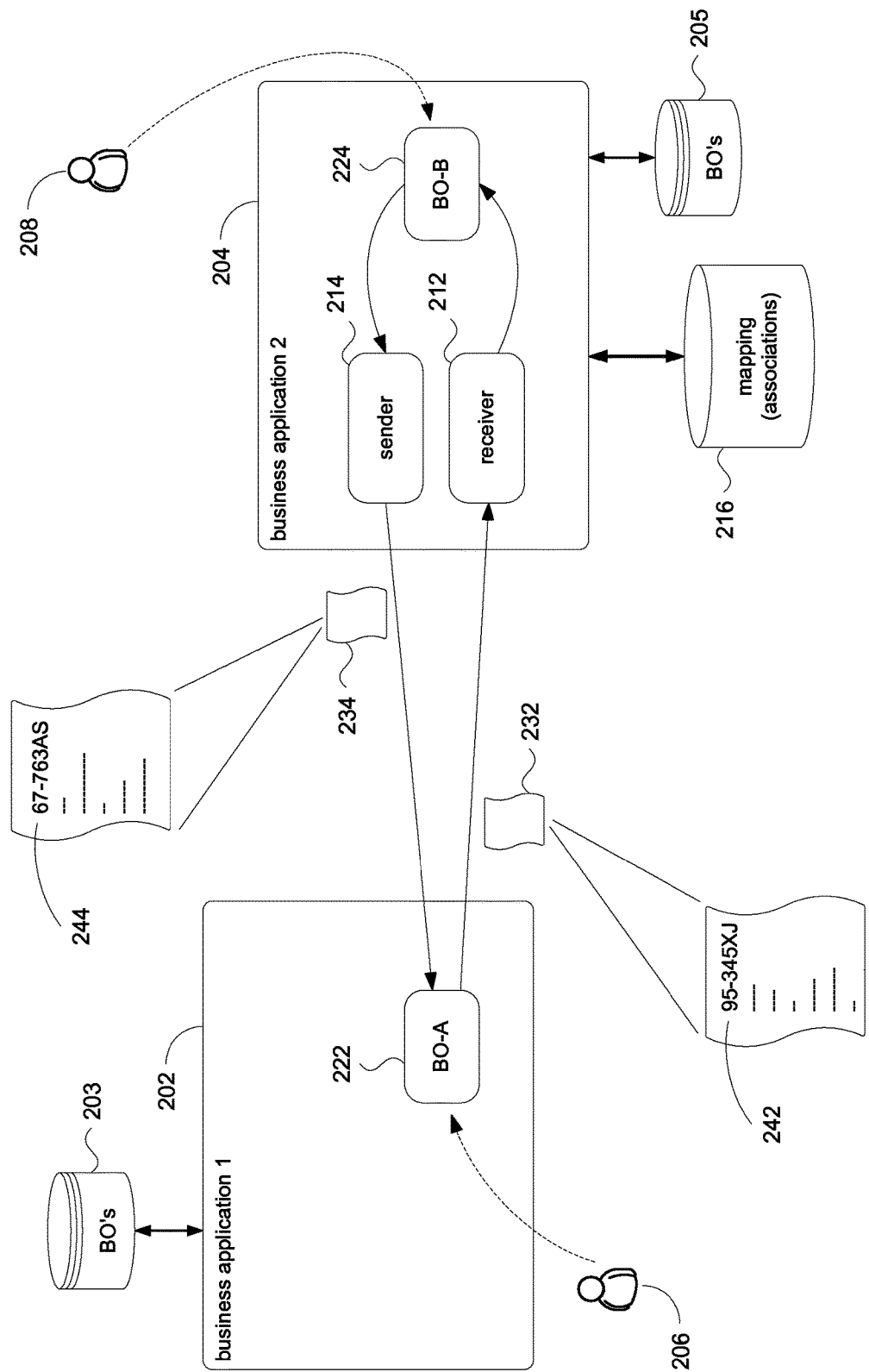
FIG. 2 illustrates synchronization processing in accordance with an embodiment of the present invention.

Referring to FIG. 2, a first business application 202 may be installed on a first computer system. The first business application 202 creates and manages a data store 203 of business objects. Similarly, a second business application 204 may be installed on a second computer system. The second business application 204 creates and manages a data store 205 of business objects. In embodiments, synchronization processing is provided so that changes made to business objects in the first business application 202 are synchronized to corresponding business objects in the second business application 204. Synchronization processing also synchronizes changes made to business objects in the second business application 204 with corresponding business objects in the first business application 202. It will be appreciated that, in some embodiments, the first business application 202 and the second business application 204 may be the same application that are executing on separate computer systems.

Information 232 pertaining to a business object 222 may be sent to the second business application 204. In an embodiment, for example, the information 232 may be embodied in an Extended Markup Language (XML) document that is created by the first business application 202 and transmitted to the second business application 204. In accordance with principles of the present invention, a receiver component 212 in the second business application 204 may be configured to receive the information 232 to perform synchronization processing. In embodiments, the receiver component 212 may be a process executing within a processing space of the second business application 204. The receiver component 212 may treat or otherwise view the business object 222 as an "inbound" business object, and identify a local business object 224 that corresponds to the inbound business object. As will be explained in more detail below, the receiver component 212 may use a mapping table 216 that maps an inbound business object to a "local" business object that is local to the second business application 204 (i.e., a business object that is created, modified, deleted, and otherwise managed by the second business application). The receiver component 212 may then update the local business object 224 with some of the information 232 pertaining to the business object 222, thus synchronizing the local business object to changes made to its associated business object 222 in the first business application 202.

Conversely, changes made by a user 208 (human, automated, etc.) to the business object 224 in the second business application 204 may be synchronized to the corresponding business object 222 in the first business application 202. In accordance with principles of the present invention, a sender component 214 in the second business application 204 may be configured to send information 234 pertaining to the business object 224 to the first business application 202. The sender component 214 may treat or otherwise view the business object 224 as a local business object. Using the mapping table 216, the sender component 214 may identify a business object in the first business application 202 that corresponds to the outbound business object 224. Information 234 may include an identifier 244 that identifies the corresponding business object in the first business application 202 (e.g., 67-763AS).

Figure 3:
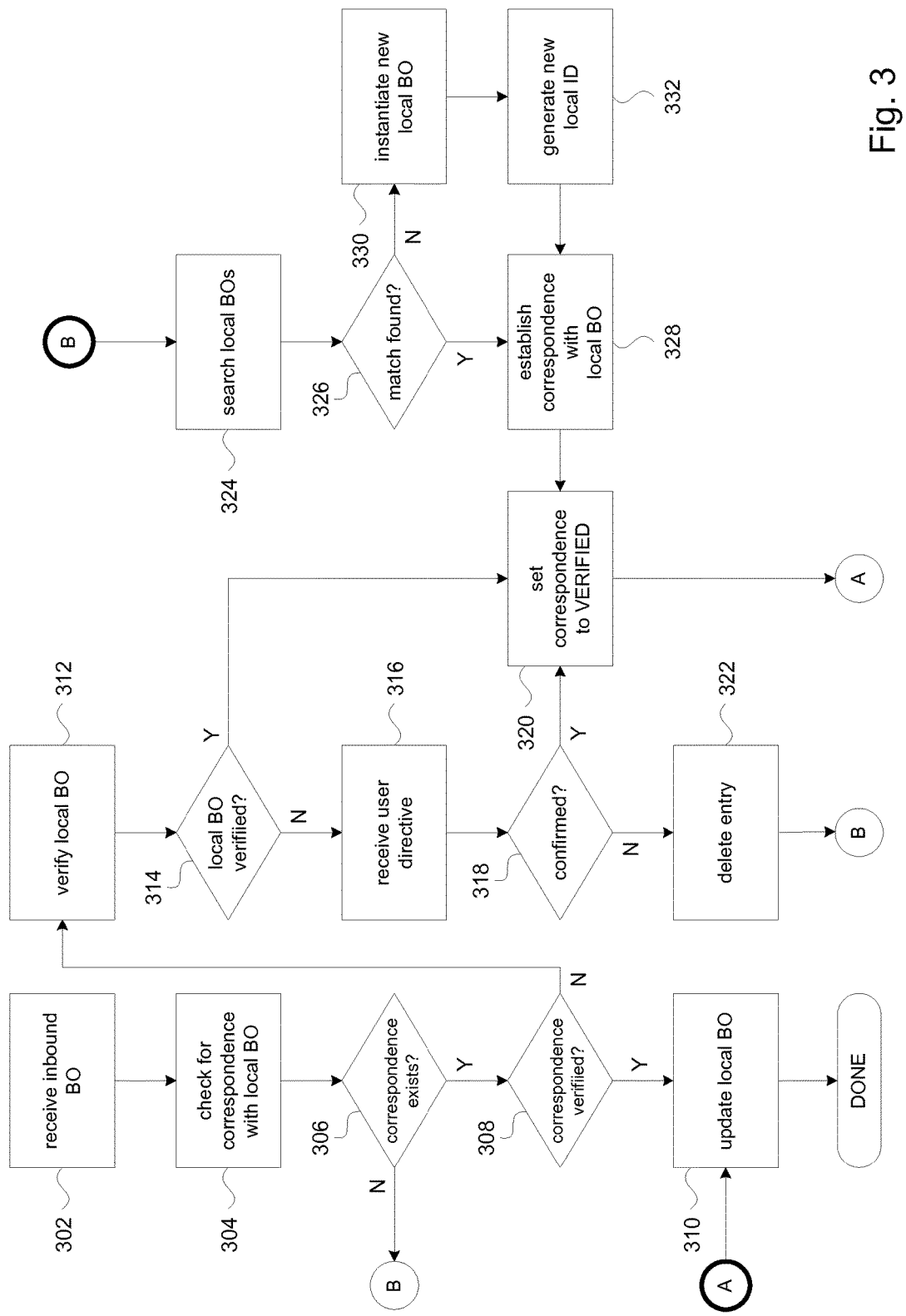
FIG. 3 represents a work flow of a receiver component in accordance with the present invention.

In embodiments, processing by the receiver component 212 may be explained in connection with the work flow shown in FIG. 3. In a step 302, the receiver component 212 may receive information 232 from the first business application 202 pertaining to business object 222. For purposes of explanation, the first business application 202 takes on the role as a "sending" business application, the information 232 may be referred to as "incoming" information, and the business object 222 takes on the role as an "inbound" business object. The information may be in any suitable data format (e.g., XML document, unformatted text, and so on). The incoming information 232 may include an identifier 242 (e.g., 95-345XJ) of the inbound business object 222. The identifier 242 serves to identify the business object 222 within the sending business application 202. For example, the identifier 242 may be an identifier created by the sending business application 202.

In a step 304, the receiver component 212 determines if the inbound business object 222 corresponds to a local business object that is local to the second business application 204. In an embodiment, a mapping table 216 may be used to provide such information. For example, referring for a moment to FIG. 4, the mapping table 216 may be a table in a relational database comprising identifiers of incoming business objects 402 (remote ID), identifiers of local business objects 404, and verified flags 406. It will be appreciated that the mapping table 216 shown in FIG. 4 may include additional information; for example, an identifier (not shown) may be included to identify the remote system corresponding to each remote ID. An incoming business object and a local business object that correspond (map) to each other will have a corresponding entry (e.g., entry 412) in the mapping table 216. Accordingly, the identifier 242 of the inbound business object 222 may be used as a search key into the mapping table 216 (e.g., via a SELECT statement) to determine if the incoming business object 222 corresponds to a local business object. It will be appreciated that other mapping techniques may be used.

In accordance with principles of the present invention, the mapping between an inbound business object and a local business object may be deemed VERIFIED or NOT VERIFIED, as indicated by the verified flag 406. When a mapping between an inbound business object and a local business object is created, that mapping may be deemed VERIFIED if there is confirmation that the two business objects do in fact refer to the same entity (e.g., customer account, company, person, etc.). However, as will be explained below, there may be situations where a mapping between two business objects is created before obtaining such confirmation. In such situations, the mapping is created but deemed NOT VERIFIED. This aspect of the present invention will be mentioned in more detail below.

In step 306, if the inbound business object 222 does not have a corresponding local business object (e.g., the SELECT operation responded with a FAIL or NULL return code, indicating that the mapping table 216 does not contain an entry for the identifier 242), then processing proceeds to step 324 in order to create a mapping between the inbound business object 222 and a local business object, which will be discussed below.

If, on the other hand, the inbound object 222 does have a corresponding local business object 224, then in step 308 the verified flag 406 of the entry 412 retrieved from the mapping table 216 (FIG. 4) is inspected. If the verified flag 406 indicates that the mapping is VERIFIED, then there is high confidence that the inbound business object 222 and the corresponding local business object 224 refer to the same thing. For example, a customer record in one business application and a sales record in another business application would be deemed VERIFIED if the two records referred to the same person. Accordingly, in a step 310, the corresponding local business object 224 may be accessed (e.g., using the identifier of the local business object obtained from the mapping table entry 412) and updated with the received information 232 pertaining to the inbound business object 222. Synchronization of the two business objects across business applications is thereby accomplished.

Returning to the decision step 308, if the verified flag 406 indicates that the mapping is NOT VERIFIED, then processing in step 312 is performed to confirm whether or not the inbound business object 222 corresponds to the local business object 224. The local business object identified in the mapping table entry 412 (FIG. 4) is obtained. In embodiments, attributes of the obtained local business object 224 may be compared with predefined or configurable attributes of the incoming business object. For example, if the inbound business object 222 and the local business object 224 are both customer records of the respective business applications then the comparison may be done based on attributes such as 'last name' and 'email address'. It can be appreciated that additional verification steps may be conducted in order to increase the level of confidence that the inbound business object in fact corresponds to the obtained local business object 224.

If, in a step 314, the correspondence between the inbound business object 222 and the obtained local business object 224 is confirmed, then the verified flag 406 is changed to VERIFIED (step 320) to indicate that the local business object corresponds to the inbound business object. As can be appreciated, the additional testing and verification procedures performed in step 312 may provide adequate confirmation in order to designate that the mapping between the inbound business object 222 and the corresponding local business object 224 is VERIFIED. Processing continues from step 320 to step 310 in order to update the local business object 224 with the received information 232 pertaining to the inbound business object 222.

If, in step 314, that the processing in step 312 resulted in no match, then in a step 316 user intervention may be invoked, allowing a user to make an explicit determination whether the inbound business object 222 in fact corresponds to the local business object. In an embodiment, where the receiver component 212 is intended to be fully automated, then user intervention may not be appropriate. In that case, processing may continue with step 324 instead of step 316, in order to create a mapping between the inbound business object 222 and a local business object.

In embodiments where user intervention is provided, if in a step 318, the user confirms that the inbound business object 222 corresponds to the obtained local business object 224, then the verified flag 406 is set to VERIFIED (step 320), and processing continues with step 310 in order to update the local business object 224 with the received information 232 pertaining to the inbound business object 222. If in step 318, the user indicates that the inbound business object 222 in fact does not correspond to the obtained local business object 224, then the entry 412 is deleted (step 322) from the mapping table 216 (FIG. 4), and processing proceeds to step 324. Processing then proceeds to step 324 in order to create a new mapping between the inbound business object 222 and a local business object.

When it is determined that the incoming business object 222 has not been previously mapped to a corresponding local business object, then in a step 324 the receiver component 212 may take steps to identify a corresponding local business object in the business object data store 205. In embodiments, a suitable matching algorithm may be employed to identify one or more candidate local business objects. For example, data in the received information 234 pertaining to the inbound business object 222 may be used to identify local candidate business objects. The candidates may be ranked (e.g., according to matching criteria) and the highest ranked candidate may then be selected as the local business object that corresponds to the inbound business object 222. Matching algorithms and matching criteria are well known and understood. Accordingly, further discussion in this respect is not needed. In an embodiment, if user interaction is desired, step 324 may involve a user who can specify which local business object, if any, corresponds to the incoming business object 222.

Figure 4:
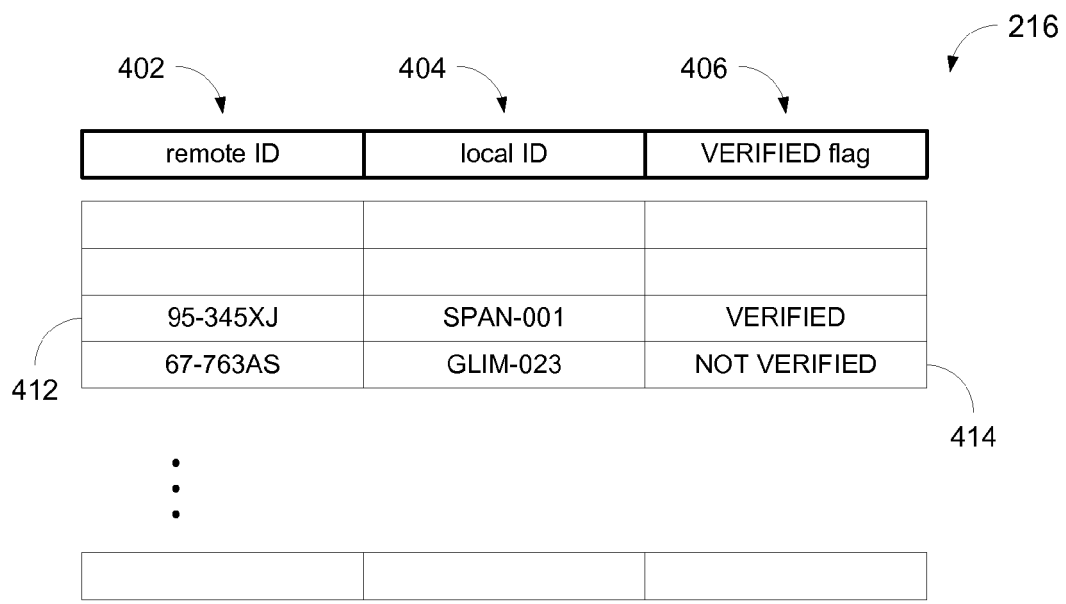
FIG. 4 represents a mapping table in accordance with the present invention.

If a matching local business object is found (step 326), then a correspondence between the inbound business object 222 and the matching local business object is created. In an embodiment, a new entry is added to the mapping table 216 (FIG. 4). The identifier fields 402 and 404 are respectively set to the identifier 242 of the inbound business object 222 and an identifier of the matching business object. Since, by operation of the process in step 324, there is high confidence in the correspondence between the two business objects, the verify flag 406 is set to VERIFIED (step 320). The new entry in the mapping table 216 thus establishes a correspondence between the inbound business object 222 and the matching local business object. Processing then continues to step 310 in order to update the newly mapped local business object 224 with the received information 232 pertaining to the inbound business object 222.

If in step 326 it is deemed that no local business object matches the inbound business object 222, then in a step 330 a new local business object is instantiated. In a step 332, a local identifier for the newly instantiated local business object is generated. In embodiments, the local identifier can be generated by any suitable means. For example, local naming rules in the second business application 204 may dictate valid names for the newly instantiated local business object. The identifier 242 of the inbound object 222 may serve as the basis for generating the local identifier. An enterprise-wide naming rule may be employed to generate the local identifier. For example, the enterprise may have a harmonized naming policy for naming the same business objects across business applications with the same name. A user may intervene in order to decide on a suitable name.

In accordance with principles of the present invention, a sender component 214 in the second business application 204 may be configured to send information 234 (e.g., in the form of an XML document) pertaining to the business object 224 to the first business application 202. The sender component 214 may treat or otherwise view the business object 224 as an outbound business object. Using the mapping table 216, the sender component 214 may identify a business object in the first business application 202 that corresponds to the outbound business object 224. Information 234 may include information that identifies the corresponding business object in the first business application 202.

Figure 5:
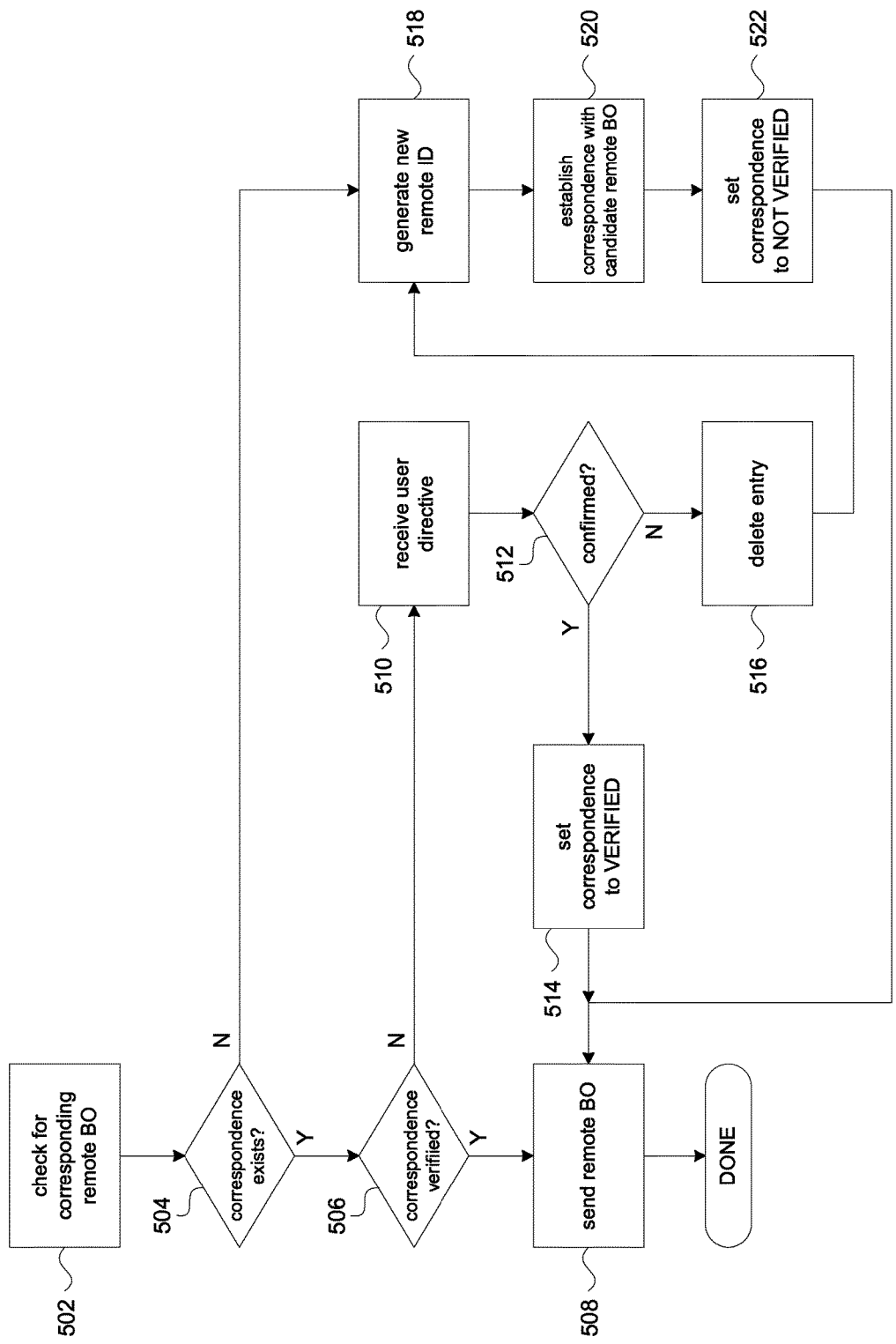
FIG. 5 represents a work flow of a sender component in accordance with the present invention.

Referring again to FIG. 2, in embodiments, when a user 208 of the second business application 204 makes changes to a local business object 224, the sender component 214 may be invoked to synchronize changes made in the local business object to a corresponding business object ("remote" business object) in the first business application 202. For purposes of explanation, the business object 222 will take on the role of "remote" business object and the first business application 202 will take on the role of a "receiving" business application. Processing in the sender component 214 may be explained in connection with the work flow shown in FIG. 5.

In a step 502, a check is made to determine if there is a remote business object in the receiving business application 202 that corresponds to the local business object 224. In embodiment, a search of the mapping table 216 (FIG. 4) using the identifier of the local business object 224 as a search key into the mapping table 216. If an entry (e.g., 412) is found, then there is a remote business object in the receiving business application 202 that corresponds to the local business object 224. In a step 504, if an entry in the mapping table 216 is not found, then processing continues at step 518 in order to create a mapping between the local business object 224 and a remote business object in the receiving business application 202, which will be discussed below.

If there is an entry 412 in the mapping table 216, then in a step 506, the verified field 406 is checked to determine if the remote business object 222 is VERIFIED. As explained above, a VERIFIED designation indicates a high degree of certainty that the remote business object 222 and the local business object 224 refer to the same thing. If the corresponding remote business object 222 is deemed VERIFIED, then in a step 508, a message is generated for transmission to the receiving business application 202. The identifier of the remote business object 222 (remote ID field 402) obtained from the mapping table entry 412 is included in the message to identify the business object in the receiving business application 202. The message further includes information pertaining to the changed local business object 224. The compiled message may then be formatted and sent to the receiving business application 202. The message format may be based on a standard format such as XML, or may be formatted using a proprietary format, or may be employ a format specific to the receiving business application, and so on.

Returning to step 506, if the correspondence between the remote business object 222 and the local business object 224 is NOT VERIFIED, then processing continues with a step 510 where user intervention may be invoked. A user may provide positive or negative confirmation about the correspondence between the two subject business objects. If, in a step 512, the user confirms the correspondence, then the verified field 406 is set to VERIFIED and processing proceeds to step 508 to prepare and send a message to the receiving business application 202. If a negative confirmation is indicated, then in a step 516 the entry in the mapping table is deleted. Processing continues with step 518 in order to create a new mapping between the local business object 224 and a remote business object in the receiving business application 202, which will now be discussed.

When it is determined that the local business object has not been mapped to a remote business object in the receiving business application 202, the sender component 214 establishes a mapping. However, in many cases the second business application 204 has insufficient to no information about what business objects are defined in the receiving business application 202. Thus, in accordance with principles of the present invention, the second business application 204 generates (step 518) an identifier (ID) that conforms to a format for identifiers used by the receiving business application 202. In embodiments, the second business application 204 generates a business object ID in accordance with naming rule(s) of the receiving business application 202. The naming rule may comprise a range of numbers (e.g., 1000-2000) that are recognized by the receiving business application 202 as business object identifiers. The naming rule may be algorithmic; e.g., an algorithm that derives an ID based on the ID used to identify the local business object. The naming rule may simply generate a random identifier that conforms with the format for identifiers used by the receiving business application 202, and so on.

In a step 520, a new entry (e.g., entry 414, FIG. 4) is added to the mapping table 216 in order to establish correspondence between the local business object 224 and a remote business object in the receiving business application 202. The new entry 414 includes the ID (e.g., 67-763AS) generated in step 518 and an ID (e.g., GLIM-023) of the local business object.

In a step 522, the verified field 406 of the new entry 414 is set to NOT VERIFIED. Completing the discussion of FIG. 5, processing continues from step 522 to step 508, where a message that includes the ID generated in step 518 is sent to the receiving business application 204.

It will be appreciated that when a new entry 414 is created, there is very little confidence that the ID of the remote business object generated in step 518 is valid, and hence the correspondence between the local business object 224 and the remote business object is deemed not verified. Verification does not take place until the remote business object is modified in the receiving business application 202, sent back to the second business application 204, and processed in accordance with the work flow shown in FIG. 3, and in particular steps 312 or 316. This aspect of the present invention may be made more clear in some use cases which will now be discussed.

Use Case: Initial Load from Legacy System

Figure 6:
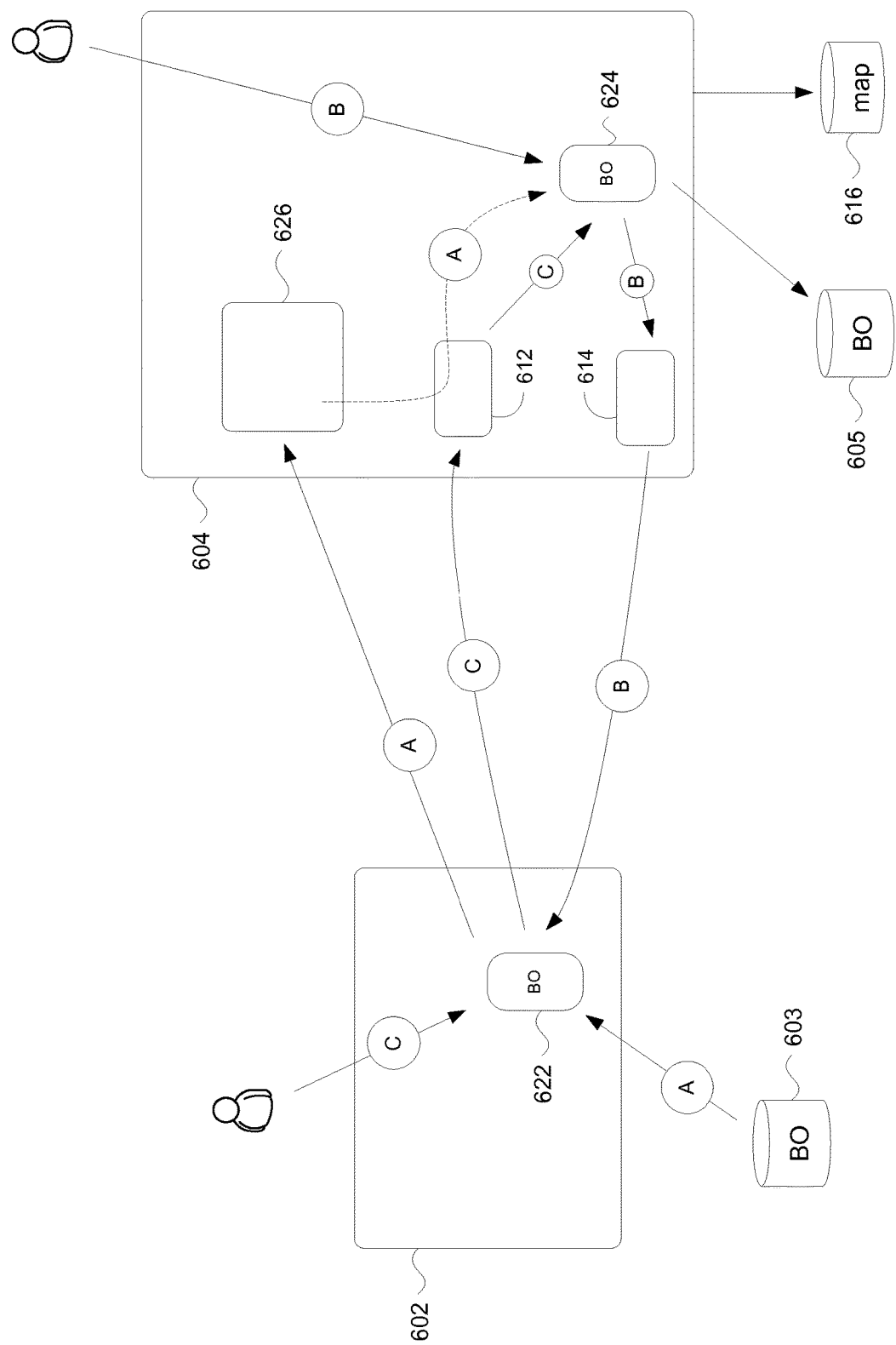
FIG. 6 illustrates a use case of providing an initial load into a new business application in accordance with the present invention.

FIG. 6 depicts a sequence for loading data from a legacy business system 602 into a new business system 604 which employs a migration tool 626. For example, an enterprise, having a legacy system (e.g., SAP® ERP), may integrate an SAP® ByDesign Sales-on-Demand system with the ERP system. The SAP® Sales-on-Demand system may include a migration tool 626 such as SAP® Migration WorkBench (MWB) which extracts instances of business objects form the legacy system 602 and import them into the Sales-on-Demand system 604.

The flow identified by A in FIG. 6 represents an initial loading sequence, where business objects 622 in the legacy system 602 are read out of a business object data store 603 and feed to the migration tool 626. A receiver component 612 in the business system 604 processes incoming business objects in accordance with the work flow of FIG. 3. Since the migration is an initial load, the business system 604 will not have any mapping table for the incoming business objects. Accordingly, each incoming business object is processed via a flow that includes steps 324, 326, 330, 328, and 320 of FIG. 3 to load new business objects into a business object data store 605 and to create the mapping table 616. Since this is an initial load of the new business system 602, the mapping table 616 correctly designates (via step 320) each of the mapped business objects as VERIFIED.

Subsequent to the initial load, changes made to business objects 624 in the business system 604 will be processed by the flow identified by B. The sender component 614 will process changes made to business objects 624 in the business system 604 according to the work flow of FIG. 5. Similarly, changes to business objects in business system 602 will be processed by the flow identified by C in the FIG.

6. Changes from the business system 602 will be received by the receiver component 612 and processed according to the work flow of FIG. 3.

Use Case: Legacy Data Migration

Figure 7:
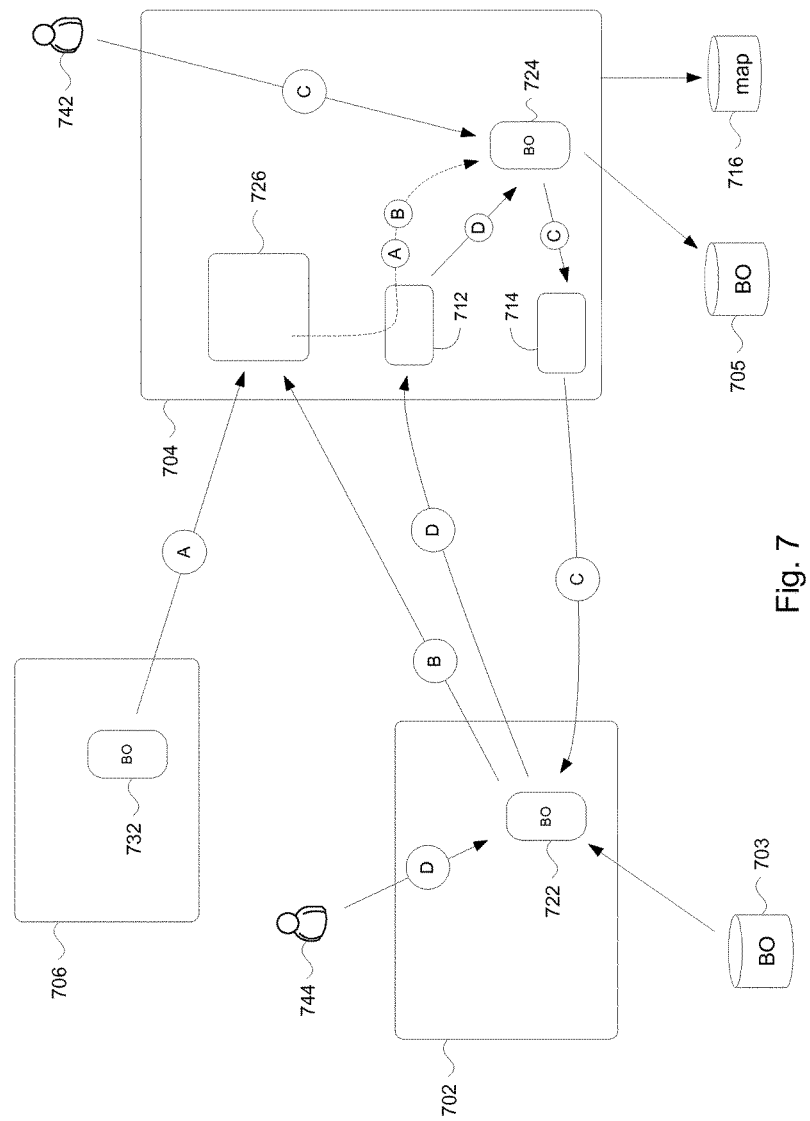
FIG. 7 illustrates a use case for performing data migration in accordance with the present invention.

FIG. 7 depicts a scenario involving two legacy systems 702 and 706, and a new system 704. In this scenario, the data in legacy systems 702 and 706 are assumed to be synchronized with each other. Suppose that the new system 704 is a replacement of legacy system 706 and that instances of business objects 732 from legacy system 706 are loaded into the new system (e.g., using migration tool 726 along path A). Suppose further that synchronization processing between legacy system 702 and the new system 704, per FIGS. 3 and 5, has not yet been initiated.

In this scenario, there is no mapping table that maps business objects of the legacy system 702 to business objects of the new system 704. Accordingly, a system administrator may want to generate such a mapping table 716 in the new system 704 before initiating synchronization processing between the two systems in order to avoid creating duplicates business objects in the new system 704 for a business object in the legacy system 702. The migration tool 726 may be invoked to export instances of business objects 722 from data store 703 of legacy system 702 into the new system 704 along path B. Since the mapping table 716 will not have any of the business object identifiers of legacy system 702, processing by the receiver component 712 will follow the path labeled "B", since the outcome of decision step 306 in FIG. 3 will always evaluate to NO. Accordingly, the receiver component 712 will either find a matching business object in data store 705 (steps 324 and 326), or will instantiate a new business object (step 330).

When the mapping table 716 is created, synchronization processing described above may commence. For example, if a user 742 in business system 704 changes a business object 724, then the changes may be synchronized with business system 702 along the processing path labeled C in the figure. In particular, the sender component 714 will process changes made to the business object 724 according to the work flow of FIG. 5. Conversely, if a user 744 in business system 702 modifies a business object 722, then the changes may be synchronized with business system 704 along the processing path labeled D in the figure. In particular, changes to the business object 722 from the business system 702 will be received by the receiver component 712 and processed according to the work flow of FIG. 3.

Figure 8:
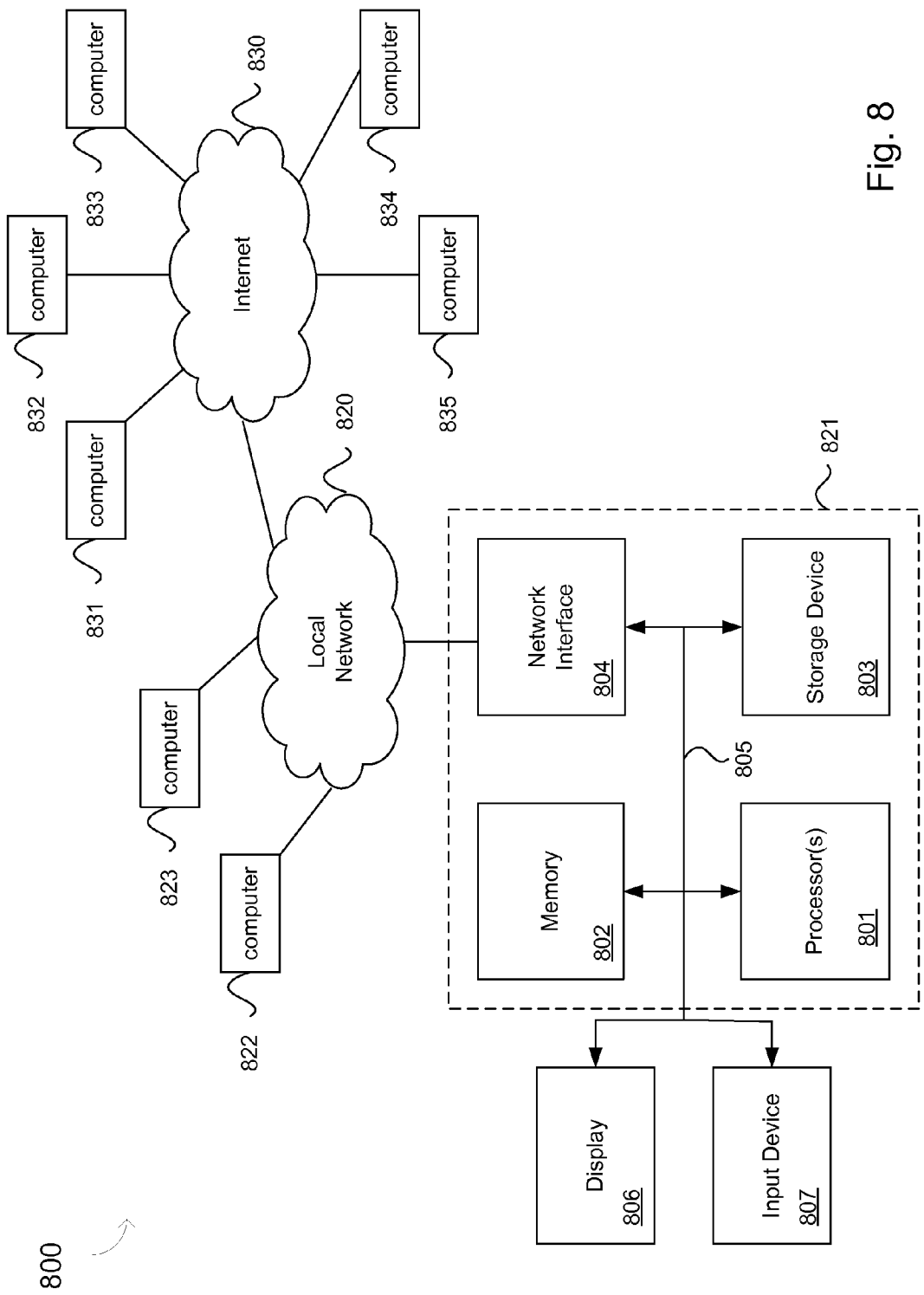
FIG. 8 illustrates a computer architecture configured in accordance with the present invention.

Referring to FIG. 8, in embodiments, a computer system 800 can be configured to operate in accordance with aspects of the present invention. The computer system 800 may comprise computers 821-823 connected by a local network 820 (e.g., a wide area network). The local network 820 may be connected to the Internet 830, to which other computers 831-835 are connected. In embodiments, the first business application 202 (FIG. 2) may be supported by any computer 821-823. Likewise, the second business application 204 maybe be supported by a computer 821-823. Applications running on computers 831-835 may require some form of secured communication.

Each computer (e.g., computer 821) may include a data processor subsystem 801 having one or more data processing units. A memory subsystem 802 may comprise random access memory (usually volatile memory such as DRAM) and non-volatile memory such as FLASH memory, ROM, and so on. A storage subsystem 803 may comprise one or more mass storage devices such as hard disk drives and the like. The storage subsystem 803 may include remote storage systems; e.g., for data mirroring, remote backup and such. A network interface subsystem 804 can provide users with access to the computer system 800, for example over a telecommunication network. A system of buses 805 can interconnect the foregoing subsystems, providing control lines, data lines, and/or voltage supply lines to/from the various subsystems. The computer system 800 may include a suitable display(s) 812 and input devices 811 such as a keyboard and a mouse input device.

The memory subsystem 802 may have stored in the non-volatile memory computer executable programs, which when executed can cause the data processing subsystem 801 to operate as a database system in accordance with aspects of the present invention. For example, the memory subsystem 802 may include computer executable programs that constitute the receiver component 212 and the sender component 214. The storage subsystem 803 may provide storage for the various database components; e.g., business objects, mapping table 216, and so on.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for processing business object information comprising operating a computer system to perform steps of:
    receiving, from a sending business application, inbound business object information pertaining to an inbound business object created by the sending business application, the inbound business object information including an identifier of the inbound business object;
    if the inbound business object does not correspond to a local business object, then creating a mapping in a table including:
        obtaining a local identifier for a local business object;
        establishing a correspondence between the inbound business object and the local business object by creating an entry in the table comprising the identifier of the inbound business object and the local identifier of the local business object, wherein the local business object is accessed by the local identifier;
        designating the correspondence between the inbound business object and the local business object as verified; and
        storing at least some of the inbound business object information in the local business object;
    if the inbound business object does correspond to a local business object and the correspondence is designated as verified, then modifying the local business object using at least some of the inbound business object information;
    if the identifier of the inbound business object does correspond to a local business object and the correspondence is designated as not verified, then:
        verifying the local business object using at least some of the inbound business object information;
        if an outcome of the verifying is positive, then modifying the local business object using at least some of the inbound business object information; and if the outcome of the verifying is negative, then performing the step of creating the mapping in the table; and sending an outbound business object to a receiving business application.

2. The method of claim 1, wherein obtaining the local identifier includes searching a plurality of local business objects for a matching local business object using at least some of the inbound business object information, wherein an identifier of the matching local business object serves as the local identifier.

3. The method of claim 2, wherein, if the searching does not result in a matching local business object, then generating an identifier based at least on some of the inbound business object information and instantiating a business object that is identified by the generated identifier, wherein the generated identifier is the local identifier and the instantiated business object is the local business object.

4. The method of claim 1, wherein the step of verifying includes comparing data comprising the local business object with data comprising the inbound business object information.

5. The method of claim 1 further comprising, when the outcome of the verifying is negative, receiving first input from a user, and in response thereto performing the step of creating a mapping.

6. The method of claim 5 further comprising, when the outcome of the verifying is negative, receiving second input from a user, and in response thereto:
designating the correspondence between the inbound business object and the local business object as verified; and
modifying the local business object using at least some of the inbound business object information.

7. The method of claim 1, wherein the outbound business object created by a business application different from the receiving business application, the sending comprising:
generating a remote identifier using one or more naming rules of the receiving business application, the receiving identifier being used to identify a business object local to the receiving business application;
associating the remote identifier with an identifier of the outbound business object, thereby establishing a correspondence between the outbound business object and the business object local to the receiving business application; and
designating the correspondence as not verified,
wherein the receiving identifier and information pertaining to the outbound business object are sent to the receiving business application.

8. The method of claim 1, wherein the sending business application and the receiving business application are the same business applications.

9. A system comprising a non-transitory computer processor and a non-transitory storage medium having stored therein computer executable program code, wherein when the computer executable program code is executed by the computer processor the computer processor:
receives, from a sending business application, inbound business object information pertaining to an inbound business object created by the sending business application, the inbound business object information including an identifier of the inbound business object;
if the inbound business object does not correspond to a local business object, then the computer processor creates a mapping in a table including:
obtaining a local identifier for a local business object;
establishing a correspondence between the inbound business object and the local business object by creating an entry in the table comprising the identifier of the inbound business object and the local identifier of the local business object, wherein the local business object is accessed by the local identifier;
designating the correspondence between the inbound business object and the local business object as verified; and
storing at least some of the inbound business object information in the local business object;
if the inbound business object does correspond to a local business object and the correspondence is designated as verified, then the computer processor modifies the local business object using at least some of the inbound business object information; and
if the identifier of the inbound business object does correspond to a local business object and the correspondence is designated as not verified, then the computer processor:
verifies the local business object using at least some of the inbound business object information;
if an outcome of the verifying is positive, then the computer processor modifies the local business object using at least some of the inbound business object information; and
if the outcome of the verifying is negative, then the computer processor creates the mapping in the table; and
sends an outbound business object to a receiving business application.

10. The system of claim 9, wherein obtaining the local identifier includes the computer processor searching a plurality of local business objects for a matching local business object using at least some of the inbound business object information, wherein an identifier of the matching local business object serves as the local identifier.

11. The system of claim 10, wherein, if the searching does not result in a matching local business object, then the computer processor generates an identifier based at least on some of the inbound business object information and instantiating a business object that is identified by the generated identifier, wherein the generated identifier is the local identifier and the instantiated business object is the local business object.

12. The system of claim 9, wherein the computer processor verifies the local business object by comparing data comprising the local business object with data comprising the inbound business object information.

13. The system of claim 9, wherein when the outcome of the verifying is negative, the computer processor receives first input from a user, and in response thereto creates the mapping.

14. The system of claim 9, wherein the outbound business object created by a business application different from the receiving business application, wherein the computer processor:
generates a remote identifier using one or more naming rules of the receiving business application, the receiving identifier being used to identify a business object local to the receiving business application;
associates the remote identifier with an identifier of the outbound business object, thereby establishing a correspondence between the outbound business object and the business object local to the receiving business application; and designates the correspondence as not verified, wherein the receiving identifier and information pertaining to the outbound business object are sent to the receiving business application.

15. A non-transitory computer readable storage medium having stored thereon an executable computer program code, which when executed by a computer, causes the computer to perform steps of:

receiving, from a sending business application, inbound business object information pertaining to an inbound business object created by the sending business application, the inbound business object information including an identifier of the inbound business object;

if the inbound business object does not correspond to a local business object, then creating a mapping in a table including:

obtaining a local identifier for a local business object;

establishing a correspondence between the inbound business object and the local business object by creating an entry in the table comprising the identifier of the inbound business object and the local identifier of the local business object, wherein the local business object is accessed by the local identifier;

designating the correspondence between the inbound business object and the local business object as verified; and storing at least some of the inbound business object information in the local business object;

if the inbound business object does correspond to a local business object and the correspondence is designated as verified, then modifying the local business object using at least some of the inbound business object information; and if the identifier of the inbound business object does correspond to a local business object and the correspondence is designated as not verified, then:

verifying the local business object using at least some of the inbound business object information;

if an outcome of the verifying is positive, then modifying the local business object using at least some of the inbound business object information; and if the outcome of the verifying is negative, then performing the step of creating the mapping in the table; and sends an outbound business object to a receiving business application.

16. The non-transitory computer readable storage medium of claim 15, wherein the step of verifying includes comparing data comprising the local business object with data comprising the inbound business object information.

17. The non-transitory computer readable storage medium of claim 15, wherein, when the outcome of the verifying is negative, receiving first input from a user, and in response thereto performing the step of creating a mapping.

18. The non-transitory computer readable storage medium of claim 17, wherein, when the outcome of the verifying is negative, receiving second input from a user, and in response thereto:

designating the correspondence between the inbound business object and the local business object as verified; and modifying the local business object using at least some of the inbound business object information.

19. The non-transitory computer readable storage medium of claim 15, wherein the outbound business object created by a business application different from the receiving business application, the sending comprising:

generating a remote identifier using one or more naming rules of the receiving business application, the receiving identifier being used to identify a business object local to the receiving business application;

associating the remote identifier with an identifier of the outbound business object, thereby establishing a correspondence between the outbound business object and the business object local to the receiving business application; and designating the correspondence as not verified, wherein the receiving identifier and information pertaining to the outbound business object are sent to the receiving business application.

20. The non-transitory computer readable storage medium of claim 15, wherein obtaining the local identifier includes searching a plurality of local business objects for a matching local business object using at least some of the inbound business object information, wherein an identifier of the matching local business object serves as the local identifier.

* * * * *